United States Patent
Asaura (10) Patent No.: US 10,823,640 B2
(45) Date of Patent: Nov. 3, 2020

(54) MISFIRE DETECTION DEVICE AND METHOD FOR DETECTING MISFIRE FOR INTERNAL COMBUSTION ENGINE

(71) Applicant: TOYOTA JIDOSHA KABUSHIKI KAISHA, Toyota (JP)

(72) Inventor: Shinya Asaura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 136 days.

(21) Appl. No.: 16/238,553

(22) Filed: Jan. 3, 2019

(65) Prior Publication Data

US 2019/0219483 A1 Jul. 18, 2019

(30) Foreign Application Priority Data

Jan. 18, 2018 (JP) .................................. 2018-006461

(51) Int. Cl.
  *G01M 15/11* (2006.01)
  *F01N 3/20* (2006.01)
  (Continued)

(52) U.S. Cl.
  CPC ............. *G01M 15/11* (2013.01); *F01N 3/208* (2013.01); *F01N 11/007* (2013.01);
  (Continued)

(58) Field of Classification Search
  CPC ........ G06F 16/275; F02D 41/22; F02D 41/02; F02D 45/00; F01N 3/10; F01N 9/00;
  (Continued)

(56) References Cited

U.S. PATENT DOCUMENTS

2008/0307772 A1* 12/2008 Kawamura ......... F02D 41/1466
60/285
2015/0075508 A1* 3/2015 Wada ..................... G01M 15/11
123/704

(Continued)

FOREIGN PATENT DOCUMENTS

CN 105683543 A 6/2016
CN 107461248 A 12/2017
(Continued)

*Primary Examiner* — Brandi N Hopkins
(74) *Attorney, Agent, or Firm* — Oblon, McClelland, Maier & Neustadt, L.L.P.

(57) ABSTRACT

A misfire detection device for an internal combustion engine includes processing circuitry. The internal combustion engine includes a selective reduction type catalyst configured to remove NOx from an exhaust gas, an addition valve arranged upstream of the catalyst to add a reducing agent into the exhaust gas, and a NOx concentration sensor arranged downstream of the catalyst to detect a downstream concentration, that is, a NOx concentration in the exhaust gas downstream of the catalyst. The processing circuitry is configured to execute an addition process adding the reducing agent into the exhaust gas with operation of the addition valve and a determination process determining that a misfire has occurred in the internal combustion engine when a detection value of the downstream concentration is decreased on condition that the addition process is being executed.

9 Claims, 6 Drawing Sheets

(51) Int. Cl.
  *G01M 15/10* (2006.01)
  *F02D 41/14* (2006.01)
  *F01N 11/00* (2006.01)
  *F02D 41/22* (2006.01)
  *G01M 15/06* (2006.01)

(52) U.S. Cl.
  CPC ......... *F02D 41/1463* (2013.01); *F02D 41/22* (2013.01); *G01M 15/06* (2013.01); *G01M 15/102* (2013.01); *F01N 2900/1402* (2013.01); *F01N 2900/1411* (2013.01); *F01N 2900/16* (2013.01); *F01N 2900/1602* (2013.01); *F02D 41/1445* (2013.01); *F02D 2200/101* (2013.01); *F02D 2200/1015* (2013.01)

(58) Field of Classification Search
  CPC .......... F01N 3/20; F01N 11/00; G01M 15/11; G01M 15/10; G01M 15/06
  See application file for complete search history.

(56) References Cited

U.S. PATENT DOCUMENTS

| | | | |
|---|---|---|---|
| 2016/0334305 A1 | 11/2016 | Hyodo | |
| 2020/0056555 A1* | 2/2020 | Charbonnel | .......... G01M 15/08 |

FOREIGN PATENT DOCUMENTS

| | | |
|---|---|---|
| JP | 2885813 B2 | 4/1999 |
| JP | 2016-217148 | 12/2016 |
| WO | WO 90/02874 A1 | 3/1990 |

\* cited by examiner

MISFIRE DETECTION DEVICE AND METHOD FOR DETECTING MISFIRE FOR INTERNAL COMBUSTION ENGINE

BACKGROUND

The present invention relates to a misfire detection device and a method for detecting a misfire for an internal combustion engine.

For example, Japanese Laid-Open Patent Publication No. 2016-217148 A discloses a misfire detection device that detects a misfire based on a rotational fluctuation amount of a crankshaft.

For example, when a rotational frequency of the crankshaft of the internal combustion engine falls within a resonance frequency band that is determined by the internal combustion engine and a component connected to the crankshaft of the internal combustion engine such as a transmission, the rotational fluctuation increases. However, when the rotational frequency of the crankshaft slightly deviates from the resonance frequency band, an amount of the rotational fluctuation in a case where there is a misfire may not markedly differ from an amount of the rotational fluctuation in a case where there is no misfire. For this reason, when the rotational frequency slightly deviates from the resonance frequency band, it may be difficult to detect a misfire based on the rotational fluctuation amount.

SUMMARY

To solve the above problem, the present invention has multiple aspects. The operations and advantages of the aspects will be described.

Aspect 1. In a misfire detection device for an internal combustion engine, the internal combustion engine includes a selective reduction type catalyst arranged in an exhaust gas passage and configured to remove NOx from an exhaust gas, an addition valve arranged in the exhaust gas passage at an upstream side of the selective reduction type catalyst and configured to add a reducing agent into the exhaust gas, and a NOx concentration sensor arranged in the exhaust gas passage at a downstream side of the selective reduction type catalyst and configured to detect a downstream concentration. The downstream concentration is a NOx concentration in the exhaust gas at the downstream side of the selective reduction type catalyst. The misfire detection device includes processing circuitry. The processing circuitry is configured to execute an addition process that adds the reducing agent into the exhaust gas through operation of the addition valve and a determination process that determines that a misfire has occurred in the internal combustion engine when a detection value of the downstream concentration is decreased on condition that the addition process is being executed.

When the addition process is being executed, the concentration of NOx in the exhaust gas flowing out downstream of the selective reduction type catalyst decreases as compared with a case where it is assumed that the addition process is not executed. Additionally, when a misfire occurs during execution of the addition process, the concentration of NOx in the exhaust gas flowing into the selective reduction type catalyst decreases as compared with a case where there is no misfire. Thus, when a misfire occurs during execution of the addition process, the downstream concentration, which is the concentration of NOx in the exhaust gas flowing out downstream of the selective reduction type catalyst, also tends to decrease as compared with a case where there is no misfire. For this reason, in the above-described configuration, occurrence of a misfire is determined based on a decrease in the detection value of the downstream concentration. Thus, even in a case where it is difficult to detect a misfire based on the rotational fluctuation amount, the misfire is accurately detected.

Aspect 2. In the misfire detection device for an internal combustion engine according to aspect 1, a NOx concentration in the exhaust gas flowing into the selective reduction type catalyst is an upstream concentration. The processing circuitry may be configured to execute a removal rate calculation process that calculates a NOx removal rate in the selective reduction type catalyst based on the upstream concentration and the downstream concentration. The determination process may include a process that determines that a misfire has occurred in the internal combustion engine when the NOx removal rate is greater than a predetermined value.

When there is a misfire, the concentration of NOx in the exhaust gas flowing into the selective reduction type catalyst decreases. Thus, when there is a misfire, the NOx removal rate of the selective reduction type catalyst tends to increase. In the above-described configuration, the predetermined value is set to be equal to or greater than the maximum value of the removal rate that is assumed in a normal state. This allows occurrence of a misfire to be determined based on the removal rate being greater than the predetermined value. In the normal state, in which there is no misfire, the removal rate is equal to or less than the predetermined value. When the removal rate changes from a state being equal to or less than the predetermined value to a state being greater than the predetermined value, the detection value of the downstream concentration decreases.

Aspect 3. In the misfire detection device for an internal combustion engine according to aspect 2, the determination process may include a variable setting process that sets the predetermined value to a smaller value in a case where a flow rate of the exhaust gas flowing into the selective reduction type catalyst is high than in a case where the flow rate of the exhaust gas is low.

When the flow rate of the exhaust gas is high, the amount of NOx flowing into the selective reduction type catalyst also tends to increase. Thus, when the flow rate of the exhaust gas is high, the removal rate of NOx tends to decrease as compared with when the flow rate of the exhaust gas is low. In the above configuration, the predetermined value is variably set depending on the flow rate of the exhaust gas. Thus, as compared to a case where the predetermined value is not variably set depending on the flow rate of the exhaust gas, the removal rate corresponding to when there is no misfire is accurately separated from the removal rate corresponding to when there is a misfire.

Aspect 4. In the misfire detection device for an internal combustion engine according to aspect 2, an adsorption amount is an amount of the reducing agent adsorbed by the selective reduction type catalyst. The determination process may include a variable setting process that sets the predetermined value to a larger value in a case where the adsorption amount is large than in a case where the adsorption amount is small.

When the amount of the reducing agent adsorbed by the selective reduction type catalyst is large, the NOx reduction performance of the selective reduction type catalyst tends to be improved as compared with a case where the adsorption amount is small. In the above configuration, the predetermined value is variably set depending on the adsorption amount. Thus, as compared to a case where the predetermined value is not variably set depending on the adsorption amount, the removal rate corresponding to when there is no misfire is accurately separated from the removal rate corresponding to when there is a misfire.

Aspect 5. In the misfire detection device for an internal combustion engine according to aspect 2, the determination process may include a variable setting process that sets the predetermined value to a larger value in a case where a temperature of the selective reduction type catalyst is high than in a case where the temperature of the selective reduction type catalyst is low.

When the temperature of the selective reduction type catalyst is high, the NOx reduction performance of the selective reduction type catalyst tends to be improved as compared with when the temperature is low. In the above configuration, the predetermined value is variably set depending on the temperature of the selective reduction type catalyst. Thus, as compared to a case where the predetermined value is not variably set depending on the temperature of the selective reduction type catalyst, the removal rate corresponding to when there is no misfire is accurately separated from the removal rate corresponding to when there is a misfire.

Aspect 6. In the misfire detection device for an internal combustion engine according to any one of aspects 2 to 5, the determination process may include a process that determines that a misfire has occurred when a cumulative time of a state in which the NOx removal rate is greater than the predetermined value is equal to or greater than a predetermined time. Even when the NOx removal rate is greater than the predetermined value, a period of time during which the NOx removal rate is decreasing may be disregarded in calculating the cumulative time.

In the above configuration, occurrence of a misfire is determined based on the cumulative time of a state in which the NOx removal rate is greater than the predetermined value. This improves the determination accuracy as compared with a configuration in which it is immediately determined that a misfire has occurred by detecting that the NOx removal rate is greater than a predetermined value. However, for example, even when there is no subsequent misfire after a single misfire, the NOx removal rate may be greater than the predetermined value for a while due to an excessive state of the reducing agent. Unlike the above-described configuration, the time in which the NOx removal rate is greater than the predetermined value may be uniformly added to the cumulative time. In such a case, to make an accurate determination, the predetermined value needs to be adapted taking into consideration a period of time during which the removal rate is greater than the predetermined value due to the excessive reducing agent. In this regard, in the above configuration, the cumulative time does not include the period of time during which the removal rate is decreasing. This prevents a period of time during which there is no misfire from being considered as a period of time during which there is a misfire and added to the cumulative time.

Aspect 7. In the misfire detection device for an internal combustion engine according to any one of aspects 1 to 6, the addition process may include an addition amount calculation process and an operation process. The addition amount calculation process calculates an addition amount of the reducing agent. The addition amount of the reducing agent is an operating amount for reducing an amount of NOx flowing out downstream of the selective reduction type catalyst through open loop control. The operation process operates the addition valve to add the reducing agent of the addition amount, which is calculated by the addition amount calculation process, to the exhaust gas.

In the above-described configuration, the addition amount is calculated through open loop control. Thus, the addition amount is not necessarily set so that the NOx concentration in the exhaust gas flowing out downstream of the selective reduction type catalyst is zero. This allows the NOx concentration sensor to easily and appropriately detect a decrease in NOx concentration.

Aspect 8. In the misfire detection device for an internal combustion engine according to any one of aspects 1 to 7, the determination process may include a process that determines that a misfire has occurred in the internal combustion engine based on a rotational fluctuation amount of a crankshaft of the internal combustion engine.

The above-described configuration includes a process of determining occurrence of a misfire based on the rotational fluctuation amount. However, when the rotational frequency slightly deviates from the resonance frequency band, the rotational fluctuation amount corresponding to when there is a misfire may not markedly differ from the rotational fluctuation amount corresponding to when there is no misfire. Thus, when the rotational frequency slightly deviates from the resonance frequency band, it may be difficult to detect a misfire based on the rotational fluctuation amount. In this regard, by using the misfire determination based on the NOx concentration in combination, even in a situation in which it is difficult to detect a misfire based on the rotational fluctuation amount, the misfire is accurately detected.

Aspect 9. In a method for detecting a misfire of an internal combustion engine, the internal combustion engine includes a selective reduction type catalyst arranged in an exhaust gas passage and configured to remove NOx from an exhaust gas, an addition valve arranged in the exhaust gas passage at an upstream side of the selective reduction type catalyst and configured to add a reducing agent into the exhaust gas, and a NOx concentration sensor arranged in the exhaust gas passage at a downstream side of the selective reduction type catalyst and configured to detect a downstream concentration. The downstream concentration is a NOx concentration in the exhaust gas at the downstream side of the selective reduction type catalyst. The method includes executing an addition process that adds the reducing agent into the exhaust gas through operation of the addition valve and executing a determination process that determines that a misfire has occurred in the internal combustion engine when a detection value of the downstream concentration is decreased on condition that the addition process is being executed.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION

First Embodiment

A misfire detection device for an internal combustion engine according to a first embodiment will now be described with reference to the drawings.

Figure 1:
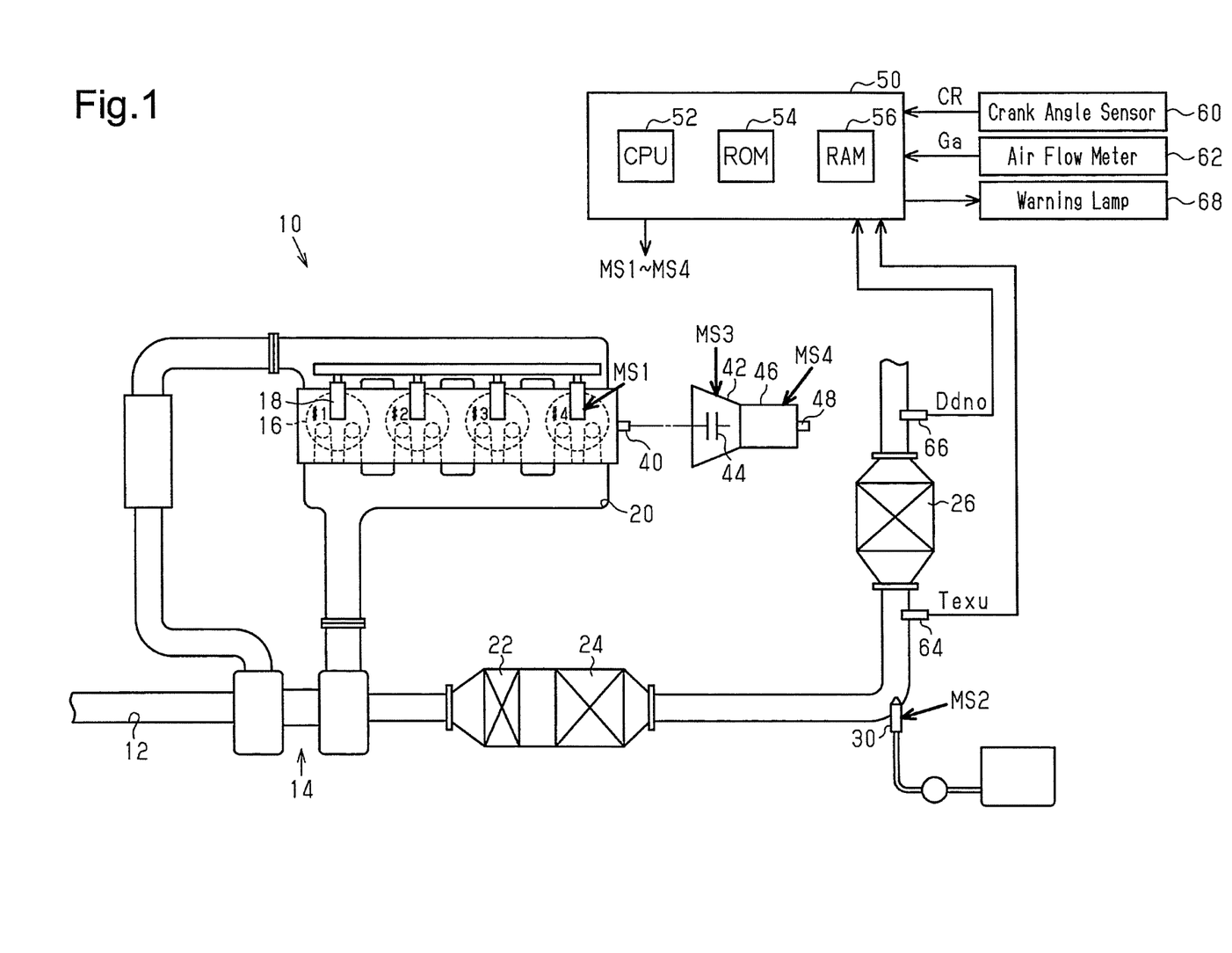
FIG. 1 is a diagram showing a misfire detection device (a control device) and an internal combustion engine according to a first embodiment.

An internal combustion engine 10 shown in FIG. 1 is an onboard prime mover. Air drawn in from an intake air passage 12 of the internal combustion engine 10 flows into combustion chambers 16 of respective cylinders #1 to #4 via a forced induction device 14. In each combustion chamber 16, for example, a fuel injection valve 18 injects fuel such as diesel oil, and the mixture of air and the fuel is burned through a compression ignition. The burned air-fuel mixture is discharged as an exhaust gas to an exhaust gas passage 20. An exhaust gas purification device is arranged in the exhaust gas passage 20 at the downstream side of the forced induction device 14. More specifically, the exhaust gas purification device includes a NOx adsorption reduction catalyst (NSR) 22, a diesel particulate filter (DPF) 24, and a selective reduction type catalyst (SCR) 26 arranged in order from the upstream side. An addition valve 30 is arranged in the exhaust gas passage 20 between the DPF 24 and the SCR 26 to add a urea solution into the exhaust gas.

A stepped transmission 46 is connected to a crankshaft 40 of the internal combustion engine 10 via a torque converter 42 that includes a lock-up clutch 44. A damper is connected to the lock-up clutch 44. The stepped transmission 46 includes an output shaft 48 mechanically connected to drive wheels.

The internal combustion engine 10 is controlled by a control device 50. In other words, the control device 50 operates operation units of the internal combustion engine 10 such as the fuel injection valves 18 and the addition valve 30 to control control aspects of the internal combustion engine 10 such as torque and exhaust components. The control device 50 controls the torque converter 42 and the stepped transmission 46. That is, the control device 50 operates, for example, the lock-up clutch 44 and the stepped transmission 46 to control the transmission ratio, or a control aspect. When controlling the control aspects, the control device 50 uses an output signal CR of a crank angle sensor 60 and an intake air amount Ga detected by an air flow meter 62. Further, the control device 50 uses an exhaust gas temperature Texu, which is a temperature of the exhaust gas between the SCR 26 and the DPF 24 detected by the exhaust gas temperature sensor 64, and a downstream concentration Ddno, which is a NOx concentration at the downstream side of the SCR 26 detected by the NOx concentration sensor 66.

The control device 50 includes a CPU 52, a ROM 54, and a RAM 56 and controls the control aspects by executing programs stored in the ROM 54 through the CPU 52.

Figure 2:
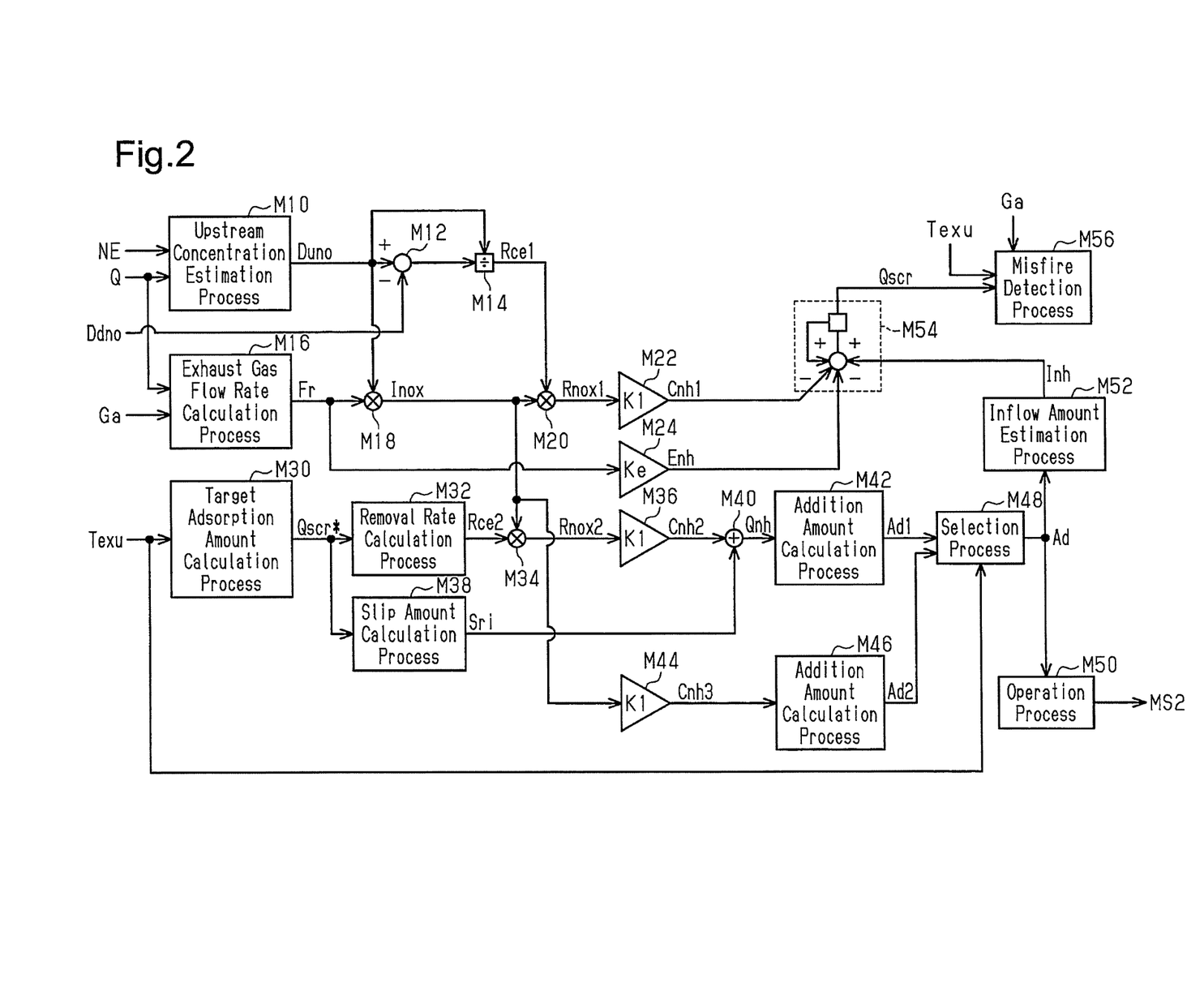
FIG. 2 is a block diagram showing some of the processes executed by the control device of FIG. 1.

FIG. 2 shows some of the processes executed by the control device 50. The processes shown in FIG. 2 are achieved by executing programs stored in the ROM 54 through the CPU 52.

An upstream concentration estimation process M10 is a process of estimating the upstream concentration Duno based on the rotational speed NE and the injection amount Q, which is an amount of fuel injected into the combustion chamber 16 by the fuel injection valve 18. The upstream concentration Duno is the NOx concentration at the upstream side of the SCR 26. This process may be achieved, for example, when the ROM 54 stores, in advance, map data in which the rotational speed NE and the injection amount Q are input variables and the upstream concentration Duno is an output variable, and the CPU 52 calculates the upstream concentration Duno through the map calculation. The map data is set data of discrete values of input variables and values of output variables corresponding to respective values of input variables. For example, when the value of an input variable matches any of the values of the input variables of the map data, the map calculation may output the value of the output variable of the corresponding map data as a calculation result. When the value of the input variable does not match the values of the input variables of the map data, the map calculation may output a value obtained by interpolating values of output variables included in the map data as a calculation result.

A subtraction process M12 is a process of subtracting the downstream concentration Ddno from the upstream concentration Duno. A removal rate calculation process M14 is a process of calculating a NOx removal rate Rce1 of the SCR 26 by dividing the output value of the subtraction process M12 by the upstream concentration Duno. The NOx removal rate of the SCR 26 refers to a ratio of the amount of removed NOx to the amount of NOx flowing into the SCR 26.

An exhaust gas flow rate calculation process M16 is a process of calculating an exhaust gas flow rate Fr based on the intake air amount Ga and the injection amount Q. An inflow NOx amount calculation process M18 is a process of calculating the inflow NOx amount Inox, which is an amount of NOx flowing into the SCR 26, by multiplying the exhaust gas flow rate Fr and the upstream concentration Duno. A reduced NOx amount calculation process M20 is a process of calculating the reduced NOx amount Rnox1, which is the amount of NOx reduced by the SCR 26, by multiplying the inflow NOx amount Inox and the removal rate Rce1. A consumed ammonia amount calculation process M22 is a process of calculating an ammonia consumption amount Cnh1 by multiplying the consumption coefficient K1 and the reduced NOx amount Rnox1. A desorption amount calculation process M24 is a process of calculating a desorption amount Enh, which is an amount of ammonia desorbed from the SCR 26, by multiplying the exhaust gas flow rate Fr and the desorption coefficient Ke.

A target adsorption amount calculation process M30 is a process of assuming that an exhaust gas temperature Texu is the temperature of the SCR 26 and calculating a target adsorption amount Qscr* to be a larger value in a case where the exhaust gas temperature Texu is high than in a case where the exhaust gas temperature Texu is low. This process may be achieved, for example, when the ROM 54 stores, in advance, map data in which the exhaust gas temperature Texu is an input variable and the target adsorption amount Qscr* is an output variable, and the CPU 52 calculates the target adsorption amount Qscr* through the map calculation. The target adsorption amount Qscr* is set to an amount of ammonia that is less than the amount of ammonia that can be adsorbed by the SCR 26.

A removal rate calculation process M32 is a process of using the target adsorption amount Qscr* as an input and calculating the removal rate Rce2 to be a larger value in a case where the target adsorption amount Qscr* is large than in a case where the target adsorption amount Qscr* is small. A reduced NOx amount calculation process M34 is a process of calculating the reduced NOx amount Rnox2 by multiplying the inflow NOx amount Inox and the removal rate Rce2. An ammonia consumption amount calculation process M36 is a process of calculating the ammonia consumption amount Cnh2 by multiplying the consumption coefficient K1 and the reduced NOx amount Rnox2.

A slip amount calculation process M38 is a process of using the target adsorption amount Qscr* as an input and calculating a slip amount Sri to a larger value in a case where the target adsorption amount Qscr* is large than in a case where the target adsorption amount Qscr* is small. The slip amount Sri is an amount of ammonia flowing out downstream of the SCR 26 without reacting with NOx in the SCR 26. This process may be achieved, for example, when the ROM 54 stores, in advance, map data in which the adsorption amount is an input variable and the slip amount Sri is an output variable, and the CPU 52 calculates the slip amount Sri through the map calculation.

An ammonia supply amount calculation process M40 is a process of calculating the ammonia supply amount Qnh by adding the ammonia consumption amount Cnh2 and the slip amount Sri. The addition amount calculation process M42 is a process of calculating a urea solution addition amount Ad1 needed to supply the ammonia supply amount Qnh of ammonia to the SCR 26. This process may be achieved, for example, when the ROM 54 stores, in advance, map data in which the ammonia supply amount Qnh is an input variable and the urea solution addition amount Ad1 is an output variable, and the CPU 52 calculates the urea solution addition amount Ad1 through the map calculation.

An ammonia consumption amount calculation process M44 is a process of calculating an ammonia consumption amount Cnh3 by multiplying the consumption coefficient K1 and the inflow NOx amount Inox. An addition amount calculation process M46 is a process of calculating a urea solution addition amount Ad2 needed to supply the ammonia consumption amount Cnh3 of ammonia to the SCR 26. The urea solution addition amount Ad2 corresponds to an amount of ammonia that can react with the inflow NOx amount Inox without any excess or deficiency.

A selection process M48 is a process of assuming that an exhaust gas temperature Texu is the temperature of the SCR 26 and selecting one of the urea solution addition amount Ad1 and the urea solution addition amount Ad2 as the final urea solution addition amount Ad based on the temperature. More specifically, the selection process M48 selects the urea solution addition amount Ad2 when the temperature is equal to or higher than a predetermined temperature, and selects the urea solution addition amount Ad1 when the temperature is less than the predetermined temperature. When the urea solution addition amount Ad is the urea solution addition amount Ad1, the urea solution addition amount Ad is an operating amount for controlling the amount of ammonia adsorbed by the SCR 26 to the target adsorption amount Qscr*. When the urea solution addition amount Ad is the urea solution addition amount Ad2, the urea solution addition amount Ad is an operating amount of an equivalent ratio control for supplying ammonia in an amount that can react with the amount of NOx flowing into the SCR 26 without any excess or deficiency.

An operation process M50 is a process of transmitting an operation signal MS2 to the addition valve 30 to operate the addition valve 30 so that the amount of urea solution added into the exhaust gas from the addition valve 30 is equal to the urea solution addition amount Ad.

An inflow amount estimation process M52 is a process of calculating an ammonia inflow amount Inh, which is an amount of ammonia flowing into the SCR 26 via the urea solution addition amount Ad of the urea solution.

An ammonia adsorption amount calculation process M54 is a process of updating the adsorption amount Qscr by adding the ammonia inflow amount Inh to the ammonia adsorption amount Qscr in the SCR 26 and subtracting the ammonia consumption amount Cnh1 and the desorption amount Enh.

A misfire detection process M56 is a process of determining whether a misfire has occurred, that is, a state in which the air-fuel mixture in the combustion chamber 16 is not burned in the combustion stroke, based on the adsorption amount Qscr, the intake air amount Ga, and the exhaust gas temperature Texu.

Figure 3:
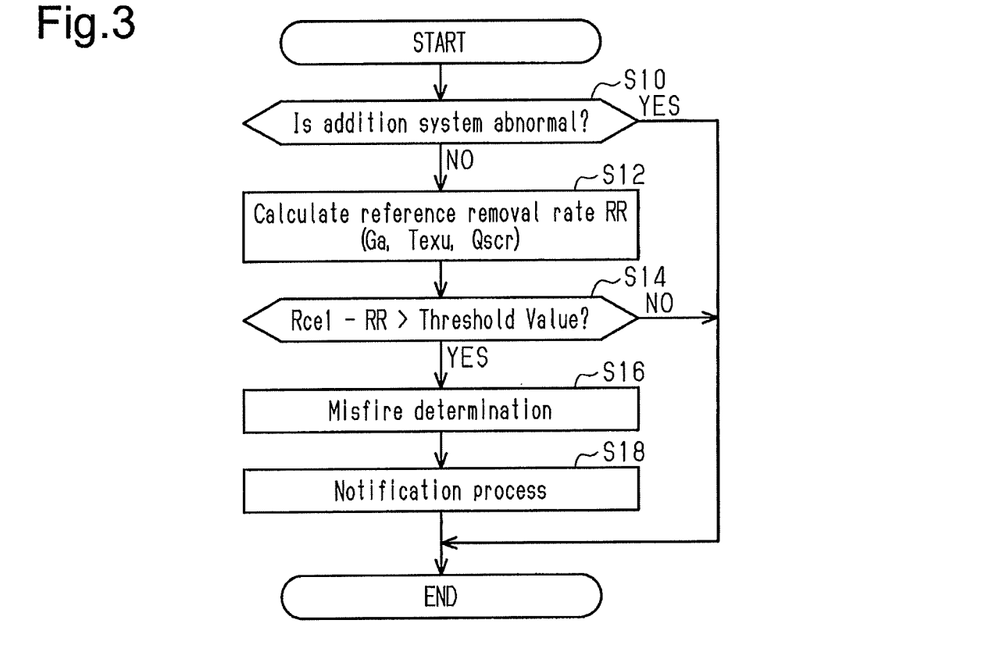
FIG. 3 is a flowchart showing the procedure of a misfire detection process executed by the control device of FIG. 1.

FIG. 3 shows the procedure of the misfire detection process M56. The process shown in FIG. 3 is achieved by the CPU 52 repeatedly executing programs stored in the ROM 54, for example, at a predetermined cycle. Hereinafter, the step numbers are represented by numerals given S in front.

In the series of processes shown in FIG. 3, the CPU 52 first determines whether there is an abnormality in the addition system including the addition valve 30 and other elements (S10). Here, for example, it is assumed that when the addition valve 30 is operated, the CPU 52 executes an abnormality diagnosis process such as determining whether or not there is an abnormality based on behavior of current flowing through the addition valve 30. The process of S10 is a process of determining whether or not the addition system is normal through the abnormality diagnosis process.

Next, the CPU 52 calculates a reference removal rate RR based on the intake air amount Ga, the exhaust gas temperature Texu, and the adsorption amount Qscr (S12). The intake air amount Ga is assumed to be the exhaust gas flow rate Fr, and the exhaust gas temperature Texu is assumed to be the temperature of the SCR 26. More specifically, in a case where the intake air amount Ga is large, the CPU 52 calculates the reference removal rate RR to be a smaller value than in a case where the intake air amount Ga is small. The amount of NOx flowing into the SCR 26 tends to be larger in a case where the exhaust gas flow rate is high than in a case where the flow rate of the exhaust gas is low. Thus, the removal rate of the SCR 26 tends to decrease as compared with a case where the inflow NOx amount is small. The CPU 52 calculates the reference removal rate RR to be a larger value in a case where the exhaust gas temperature Texu is high than in a case where the exhaust gas temperature Texu is low. This is because the NOx removal rate of the SCR 26 is higher in a case where the temperature of the SCR 26 is high than in a case where the temperature of the SCR 26 is low. However, although the SCR 26 practically has a tendency that the removal rate increases as the temperature becomes higher than a low temperature such as in a cold startup of the internal combustion engine 10, the removal rate decreases when the temperature increases further. In the first embodiment, it is assumed that the temperature of the SCR 26 will not be so high as to cause a decrease in the removal rate at the time of normal operation of the internal combustion engine 10. Further, the CPU 52 calculates the reference removal rate RR to be a larger value in a case where the adsorption amount Qscr is large than in a case where the adsorption amount Qscr is small.

More specifically, the ROM 54 stores, in advance, map data in which the intake air amount Ga, the exhaust gas temperature Texu, and the adsorption amount Qscr are input variables and the reference removal rate RR is an output variable, and the CPU 52 calculates the reference removal rate RR through the map calculation.

Next, the CPU 52 determines whether the value obtained by subtracting the reference removal rate RR from the removal rate Rce1 is greater than a threshold value (S14). This process is a process of determining whether or not a misfire continuously occurs over a number of combustion cycles in a specific one of the cylinders #1 to #4. More specifically, when there is a misfire, the concentration of NOx in the exhaust gas discharged from the combustion chamber 16 decreases as compared with a case where there is no misfire. However, in the addition amount calculation process M42, the urea solution addition amount Ad1 is calculated on the assumption that there is no misfire. Also, in the addition amount calculation process M46, the urea solution addition amount Ad2 is calculated on the assumption that there is no misfire. Thus, when there is a misfire, the amount of urea solution added from the addition valve 30 tends to be excessive. Thus, when there is a misfire, the downstream concentration Ddno tends to be smaller than when there is no misfire. Moreover, the upstream concentration estimation process M10, shown in FIG. 2, calculates the upstream concentration Duno on the assumption that there is no misfire. The upstream concentration Duno calculated when there is a misfire is greater than the actual NOx concentration. Thus, when there is a misfire, the removal rate Rce1 tends to be larger than when there is no misfire.

When determining that the value obtained by subtracting the reference removal rate RR from the removal rate Rce1 is larger than the threshold value (S14: YES), the CPU 52 determines that there is a misfire (S16). The CPU 52 operates a warning lamp 68 shown in FIG. 1 to execute a notification process (S18) to prompt the user to repair the vehicle.

When the process of S18 is completed or when a negative determination is made in the process of S10 or S14, the CPU 52 temporarily ends the series of processes shown in FIG. 3.

The operation and advantages of the first embodiment will be described.

Figure 4:
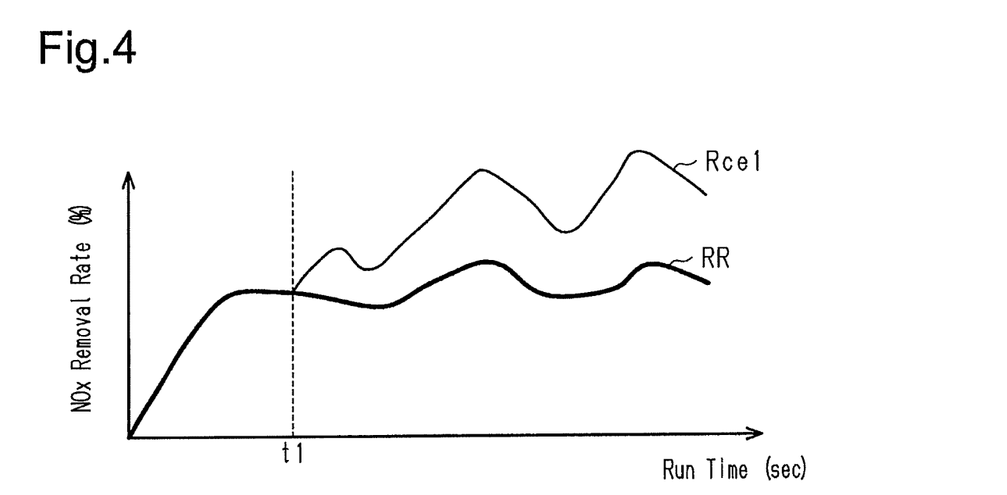
FIG. 4 is a time chart showing the effect of the control device of FIG. 1.

FIG. 4 shows changes in the reference removal rate RR and the removal rate Rce1.

In FIG. 4, a misfire occurs at time t1. From time t1, the removal rate Rce1 is greater than the reference removal rate RR. When the degree at which the removal rate Rce1 exceeds the reference removal rate RR is greater than the threshold value, the CPU 52 determines that a misfire is continuously occurring in at least one of the cylinders #1 to #4.

As described above, in the first embodiment, whether or not there is a misfire is determined based on the removal rate Rce1. Thus, even in a case where it is difficult to detect a misfire based on the rotational fluctuation amount of the crankshaft 40, the misfire is accurately detected. More specifically, when a rotational frequency proportional to the reciprocal of the rotational speed NE of the crankshaft 40 falls within a resonance frequency band of a drive system that includes, for example, the internal combustion engine 10 and the torque converter 42, the rotational fluctuation amount of the crankshaft 40 increases. In particular, the rotational fluctuation amount increases when there is a misfire. However, when the rotational frequency slightly deviates from the resonance frequency band, even if there is a misfire, the rotational fluctuation amount will not markedly differ from that when there is no misfire. Thus, it may be difficult to detect occurrence of the misfire.

According to the first embodiment, the following advantages can be further obtained.

(1) When the intake air amount Ga is large, the CPU 52 calculates the reference removal rate RR to be a smaller value than when the intake air amount Ga is small. Accordingly, the reference removal rate RR is calculated in consideration of the tendency for the amount of NOx flowing into the SCR 26 to increase when the exhaust gas flow rate is high. Through the calculation of the reference removal rate RR as described above, the removal rate corresponding to when there is no misfire is accurately separated from the removal rate corresponding to when there is a misfire.

(2) When the adsorption amount Qscr, which is the amount of ammonia adsorbed by the SCR 26, is large, the CPU 52 calculates the reference removal rate RR to be a larger value than when the adsorption amount Qscr is small. Accordingly, the reference removal rate RR is calculated in consideration of the dependency of the removal rate on the adsorption amount. Through the calculation of the reference removal rate RR as described above, the removal rate corresponding to when there is no misfire is accurately separated from the removal rate corresponding to when there is a misfire.

(3) When the exhaust gas temperature Texu is high, the CPU 52 calculates the reference removal rate RR to be a larger value than when the exhaust gas temperature Texu is low. Accordingly, the reference removal rate RR is calculated in consideration of the dependency of the removal rate of the SCR 26 on the temperature of the SCR 26. Through the calculation of the reference removal rate RR as described above, the removal rate corresponding to when there is no misfire is accurately separated from the removal rate corresponding to when there is a misfire.

Second Embodiment

A second embodiment will now be described with reference to the drawings, focusing on differences from the first embodiment.

Figure 5:
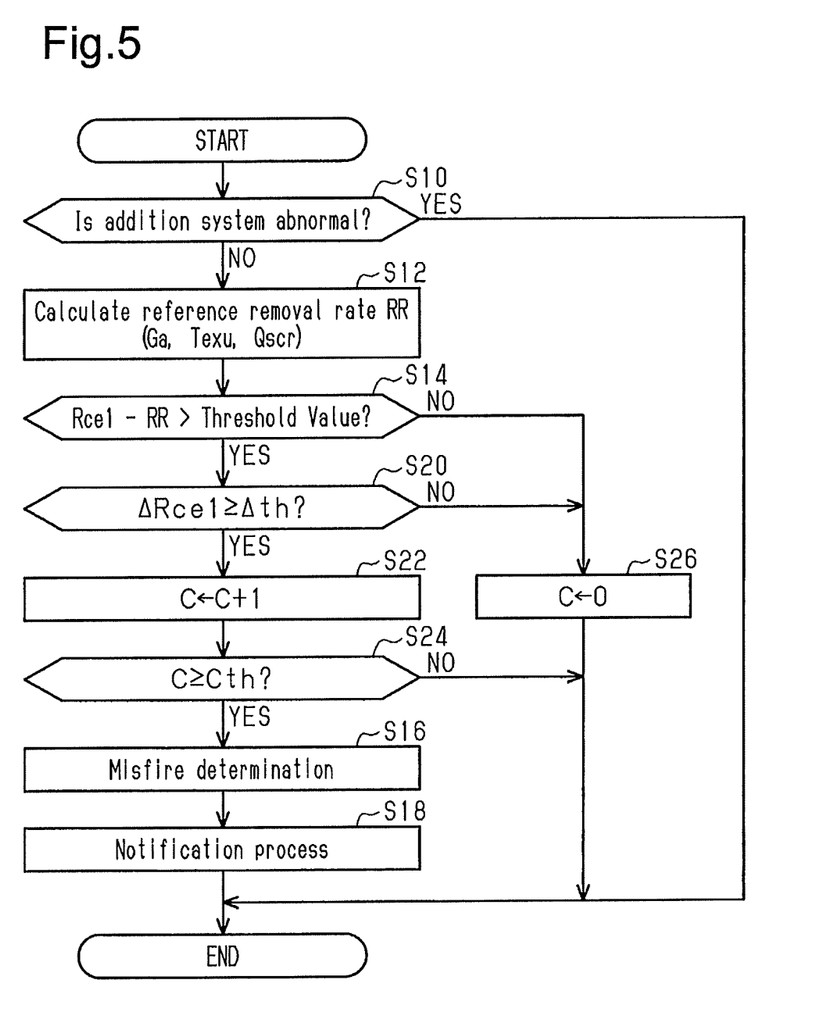
FIG. 5 is a flowchart showing the procedure of a misfire detection process executed by a control device of a second embodiment.

FIG. 5 shows the procedure of the misfire detection process M56. The process shown in FIG. 5 is achieved by the CPU 52 repeatedly executing programs stored in the ROM 54, for example, at a predetermined cycle. In FIG. 5, for the sake of convenience, the processes corresponding to the processes shown in FIG. 3 are denoted by the same step numbers.

In the series of processes shown in FIG. 5, when an affirmative determination is made in the process of S14, the CPU 52 determines whether or not a change amount $\Delta Rce1$ of the removal rate Rce1 per unit time is equal to or greater than a predetermined amount $\Delta th$ (S20). The change amount $\Delta Rce1$ may be, for example, a value obtained by subtracting the removal rate Rce1 in the previous control cycle from the removal rate Rce1 in the current control cycle in the series of processes shown in FIG. 5. The predetermined amount $\Delta th$ is set to, for example, a value proximate to zero. The process of S20 is a process of determining whether or not the removal rate Rce1 significantly decreases. When determining that the change amount $\Delta Rce1$ is equal to or greater than the predetermined amount $\Delta th$ (S20: YES), the CPU 52 increments the counter C (S22). Then, the CPU 52 determines whether or not the counter C is equal to or greater than a predetermined time Cth (S24). When determining that the counter C is equal to or greater than the predetermined time Cth (S24: YES), the CPU 52 proceeds to the process of S16.

When a negative determination is made in the process of S14 or S20, the CPU 52 initializes the counter C (S26). When the process of S26 is completed or when a negative determination is made in the process of S24, the CPU 52 ends the series of processes shown in FIG. 5.

As described above, in the second embodiment, whether or not there is a misfire is determined based on a duration time for which the degree at which the removal rate Rce1 exceeds the reference removal rate RR continues to be greater than the threshold value. This increases the resistance to noise during determination of a misfire. However, for example, when the degree at which the removal rate Rce1 exceeds the reference removal rate RR is greater than the threshold due to, for example, occurrence of a single misfire, a certain amount of time is necessary for the removal rate Rce1 to decrease approximately to the reference removal rate RR. In this regard, when the removal rate Rce1 is decreasing toward the reference removal rate RR, the counter C is not incremented to avoid a situation in which the counter C is incremented when there is no actual misfire. That is, in the second embodiment, the CPU 52 increments the counter C only when an affirmative determination is made in the process of S20.

Third Embodiment

A third embodiment will now be described with reference to the drawings, focusing on differences from the first embodiment.

Figure 6:
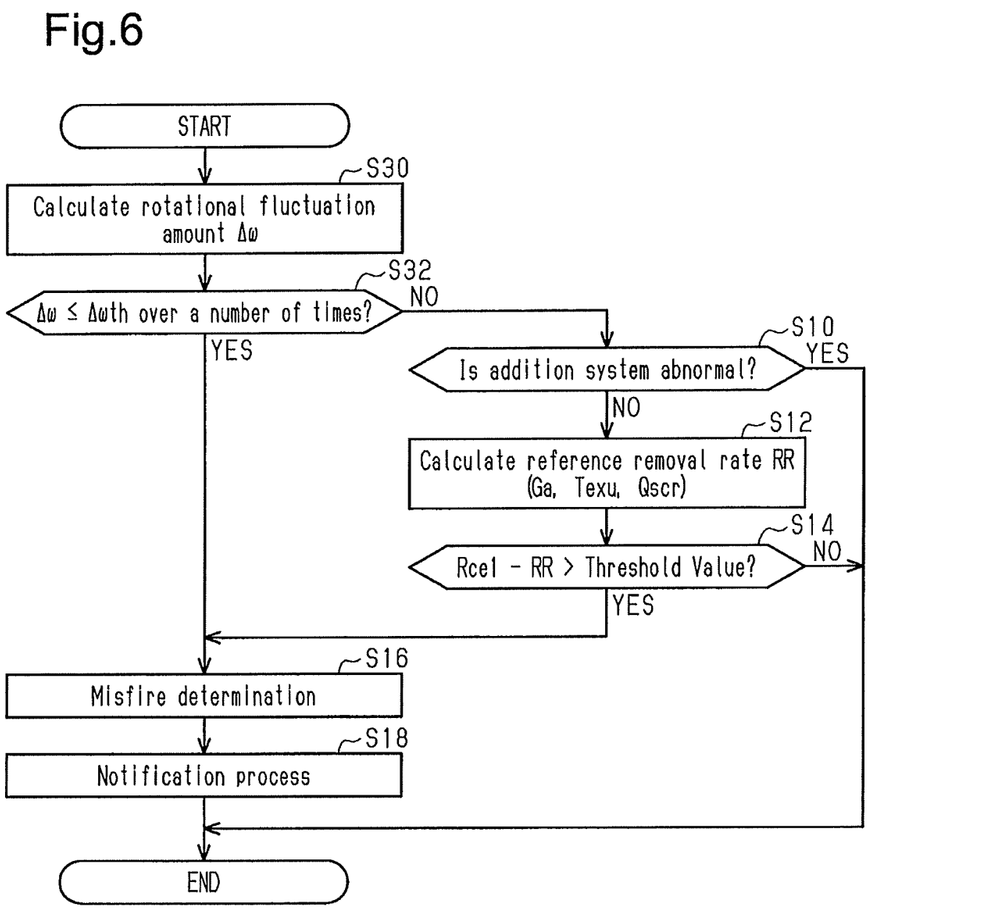
FIG. 6 is a flowchart showing the procedure of a misfire detection process executed by a control device of a third embodiment.

In the third embodiment, the misfire detection process based on the rotational fluctuation amount of the crankshaft 40 is used together with the misfire detection process based on the removal rate Rce1.

FIG. 6 shows the procedure of the misfire detection process M56 according to the third embodiment. The process shown in FIG. 6 is achieved by the CPU 52 repeatedly executing programs stored in the ROM 54, for example, at a predetermined cycle. In FIG. 6, for the sake of convenience, processes corresponding to the processes shown in FIG. 3 are denoted by the same step numbers.

In the series of processes shown in FIG. 6, the CPU 52 calculates a rotational fluctuation amount A& of the crankshaft 40 based on the output signal CR of the crank angle sensor 60 (S30). In detail, the rotational fluctuation amount A is calculated as described below. The CPU 52 calculates the rotational speed corresponding to a point in time at which a piston reaches compression top dead center. In detail, the rotational speed is an average rotational speed in a predetermined angular range including the crank angle corresponding to a point in time at which the piston reaches compression top dead center. The rotational fluctuation amount A is a value obtained by subtracting, from the value of the rotational speed corresponding to a point in time at which the piston in a cylinder reaches compression top dead center, the value of the rotational speed corresponding to a point in time at which the piston in the next cylinder reaches compression top dead center. Then, the CPU 52 determines, for each of the cylinders #1 to #4, whether or not the rotational fluctuation amount $\Delta\omega$ continues to be equal to or less than a threshold value $\Delta\omega th$ (<0) over a number of combustion cycles (S32). This process is a process of determining whether or not misfires continue to occur over a number of combustion cycles in a specific one of the cylinders #1 to #4. When an affirmative determination is made in the process of S32, the CPU 52 proceeds to the process of S16. When a negative determination is made in the process of S32, the CPU 52 proceeds to the process of S10.

In this way, in the third embodiment, the misfire detection process based on the rotational fluctuation amount $\Delta\omega$ of the crankshaft 40 is used with the misfire detection process based on the removal rate Rce1. In a region where the rotational frequency slightly deviates from the resonance frequency band, the rotational fluctuation amount corresponding to when there is a misfire may not markedly differ from the rotational fluctuation amount corresponding to when there is no misfire. In this case, the determination of occurrence of a misfire based on the processes of S30 and S32 may fail. However, occurrence of a misfire is accurately determined based on the removal rate Rce1.

Fourth Embodiment

A fourth embodiment will now be described with reference to the drawings, focusing on differences from the third embodiment.

Figure 7:
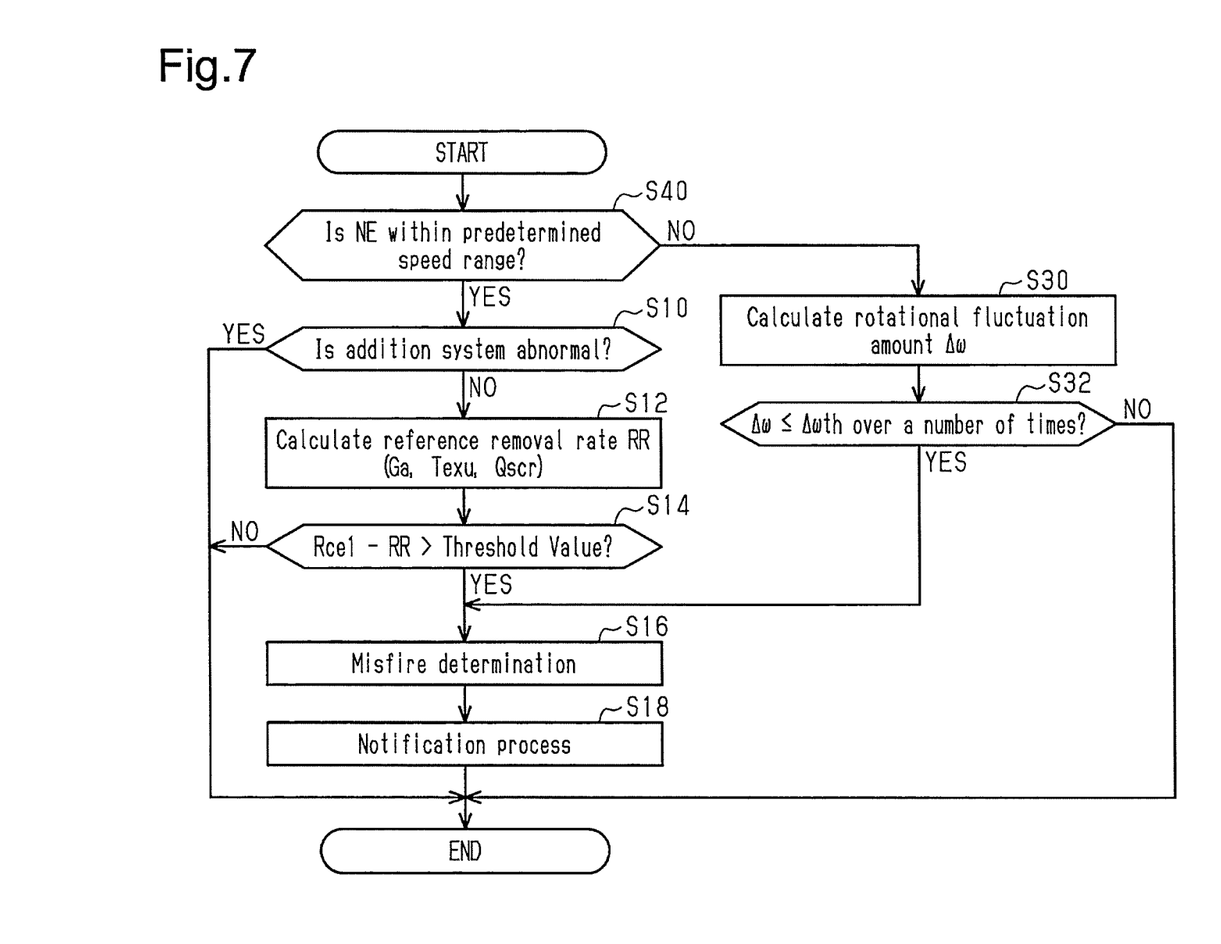
FIG. 7 is a flowchart showing the procedure of a misfire detection process executed by a control device of a fourth embodiment.

FIG. 7 shows the procedure of the misfire detection process M56 according to the fourth embodiment. The process shown in FIG. 7 is achieved by the CPU 52 repeatedly executing programs stored in the ROM 54, for example, at a predetermined cycle. In FIG. 7, for the sake of convenience, processes corresponding to the processes shown in FIG. 6 are denoted by the same step numbers.

In the series of processes shown in FIG. 7, the CPU 52 determines whether or not the rotational speed NE is within the predetermined speed range (S40). When the rotational speed NE is within the predetermined speed range, the rotational frequency of the crankshaft 40 is in a speed region that slightly deviates from the resonance frequency band. That is, when the rotational speed NE is within the predetermined speed range, there is a possibility that the rotational fluctuation amount corresponding to when there is a misfire will not markedly differ from the rotational fluctuation amount corresponding to when there is no misfire. When an affirmative determination is made in the process of S40, the CPU 52 proceeds to the process of S10. When a negative determination is made in the process of S40, the CPU 52 proceeds to the process of S30.

Correspondence Relations

Correspondence relations between the items of the embodiments and the items described in the section of "SUMMARY" are as follows. Hereinafter, the correspondence relations are shown for each number of the aspect described in the section of "SUMMARY."

[1] and [9] The addition process corresponds to the upstream concentration estimation process M10, the exhaust gas flow rate calculation process M16, the inflow NOx amount calculation process M18, the target adsorption amount calculation process M30, the removal rate calculation process M32, the reduced NOx amount calculation process M34, the ammonia consumption amount calculation process M36, the slip amount calculation process M38, the ammonia supply amount calculation process M40, the addition amount calculation processes M42 and M46, the ammonia consumption amount calculation process M44, the selection process M48, and the operation process M50. The determination process corresponds to the process of S12 to S16 of FIG. 3 or the process of S12 to S16 and S20 to S26 of FIG. 5.

[2] The predetermined value corresponds to the sum of the reference removal rate RR and the threshold value.

[3], [4], and [5] The variable setting process corresponds to the process of S12.

[6] The determination process corresponds to the process shown in FIG. 5.

[7] The addition amount calculation process corresponds to the upstream concentration estimation process M10, the exhaust gas flow rate calculation process M16, the inflow NOx amount calculation process M18, the target adsorption amount calculation process M30, the removal rate calculation process M32, the reduced NOx amount calculation process M34, the ammonia consumption amount calculation process M36, the slip amount calculation process M38, the ammonia supply amount calculation process M40, the addition amount calculation processes M42 and M46, the ammonia consumption amount calculation process M44, and the selection process M48.

[8] The determination process corresponds to the process shown in FIG. 6 or FIG. 7.

Other Embodiments

The first to fourth embodiments may be modified as follows. The first to fourth embodiments and the following modified examples can be combined within the scope that there is no technical contradiction.

Variable Setting Process

In the above embodiments, the reference removal rate RR is variably set based on the intake air amount Ga, the exhaust gas temperature Texu, and the adsorption amount Qscr, but it is not limited thereto. For example, the reference removal rate RR may be variably set based on only one of the intake air amount Ga, the exhaust gas temperature Texu, and the adsorption amount Qscr. The reference removal rate RR may be variably set based on only two of the intake air amount Ga, the exhaust gas temperature Texu, and the adsorption amount Qscr. Further, the exhaust gas flow rate Fr may be used instead of the intake air amount Ga. The SCR 26 may include a temperature sensor such as a thermocouple, and the detection value of the temperature sensor may be used instead of the exhaust gas temperature Texu.

For example, the rotational speed NE may be used as an input parameter of the process for variably setting the reference removal rate RR. The rotational speed NE is a parameter having a positive correlation with the exhaust gas flow rate Fr. The temperature of the exhaust gas between the forced induction device 14 and the NSR 22 shown in FIG. 1 may be used as a parameter correlated with the temperature of the SCR 26.

It is not essential to execute the variable setting process.

Determination Process

In the process of FIG. 5, when a negative determination is made in the process of S20, the process may proceed to S24. That is, in a period of time during which the affirmative determination is made in the process of S14, it is determined that there is a misfire when the cumulative time of a state in which the affirmative determination is made in the process of S20 reaches the predetermined time Cth. More specifically, when the process of FIG. 5 is repeatedly executed a number of times and the affirmative determination is continuously made in the process of step S14, the number of times that the affirmative determination is made in step S20 is counted. The number of affirmative determinations corresponds to the cumulative time, and it is determined that there is a misfire when the cumulative time reaches the predetermined time Cth.

The determination process for determining that there is a misfire is not limited to the process of determining that there is a misfire when the removal rate Rce1 is greater than a predetermined value (reference removal rate RR+threshold value). For example, the determination process of determining that there is a misfire may be a process of determining that there is a misfire when the decrease amount (positive in the case of decreasing) of the exhaust gas flow rate Fr is equal to or less than the predetermined amount and the downstream concentration Ddno detected by the NOx concentration sensor 66 is decreased by a specified amount or more. The decrease amount of the exhaust gas flow rate Fr being equal to or less than the predetermined amount is a condition that ensures that an increased amount of the removal rate of the SCR 26 is small when there is no misfire.

Removal Rate Calculation Process

In the above embodiment, the upstream concentration Duno is calculated based on the rotational speed NE and the injection amount Q, which specify the operating point of the internal combustion engine 10, but the present invention is not limited thereto. For example, an air-fuel ratio sensor may be arranged at the upstream side of the SCR 26 so that the upstream concentration Duno is calculated based on, for example, a detection value of the air-fuel ratio sensor. For example, a NOx concentration sensor for detecting the NOx concentration may be arranged at the upstream side of the SCR 26 so that the removal rate is calculated using a detection value of the NOx concentration sensor. In this case, when there is a misfire, the upstream concentration Duno is lower than when there is no misfire. However, since the urea solution addition amount Ad is calculated on the assumption that there is no misfire, the removal rate tends to be calculated to be a large value.

Addition Amount Calculation Process

The addition amount calculation process for calculating the urea solution addition amount Ad, which is an operating amount for reducing the amount of NOx flowing out downstream of the SCR 26 through open loop control, is not limited to the process exemplified in the embodiments. For example, only a constant equivalence ratio control may be executed. Additionally, for example, when the ROM 54 stores, in advance, map data in which the rotational speed NE and the injection amount are input variables and the urea solution addition amount Ad is an output variable, the CPU 52 may calculate the urea solution addition amount Ad through the map calculation.

Misfire Detection Process

The misfire detection process executed based on the removal rate Rce1 shown in FIG. 6 or FIG. 7 is the misfire detection process shown in FIG. 3. Instead, for example, the misfire detection process executed based on the removal rate Rce1 shown in FIG. 6 or FIG. 7 may be the misfire detection process shown in FIG. 5.

Misfire Detection Device

The misfire detection device is not limited to a device that includes the CPU 52 and the ROM 54 and executes software processes. For example, the misfire detection device may include a dedicated hardware circuit (e.g., an ASIC) that processes at least some of the software processes executed in the embodiments. More specifically, the misfire detection device may have any of the following configurations (a) to (c). The misfire detection device includes (a) a processing unit that executes all of the processes described above in accordance with programs and a program storage device such as a ROM that stores the programs. The misfire detection device includes (b) a processing unit and a program storage device for executing some of the processes described above in accordance with programs and a dedicated hardware circuit for executing the remaining processes. The misfire detection device includes (c) a dedicated hardware circuit for executing all of the processes described above. Multiple software circuits including the processing unit and the program storage device may be provided. Multiple dedicated hardware circuits may be provided. That is, the process may be executed by processing circuitry that includes at least one of one or more software circuits and one or more dedicated hardware circuits. A program storage device, or a computer readable medium, includes any available medium that can be accessed by a general-purpose or specified-purpose computer.

Internal Combustion Engine

An ammonia oxidation catalyst may be arranged at the downstream side of the SCR 26. In this case, the NOx concentration sensor 66 may be arranged between the ammonia oxidation catalyst and the SCR 26 or may be arranged, for example, at the downstream side of the ammonia oxidation catalyst.

The internal combustion engine is not limited to a four-cylinder internal combustion engine. For example, it may be an in-line six-cylinder internal combustion engine.

Therefore, the present examples and embodiments are to be considered as illustrative and not restrictive and the invention is not to be limited to the details given herein, but may be modified within the scope and equivalence of the appended claims.

The invention claimed is:

1. A misfire detection device for an internal combustion engine, wherein the internal combustion engine includes a selective reduction type catalyst arranged in an exhaust gas passage and configured to remove NOx from an exhaust gas, an addition valve arranged in the exhaust gas passage at an upstream side of the selective reduction type catalyst and configured to add a reducing agent into the exhaust gas, and a NOx concentration sensor arranged in the exhaust gas passage at a downstream side of the selective reduction type catalyst and configured to detect a downstream concentration, the downstream concentration being a NOx concentration in the exhaust gas at the downstream side of the selective reduction type catalyst, the misfire detection device, comprising processing circuitry, wherein the processing circuitry is configured to execute an addition process that adds the reducing agent into the exhaust gas through operation of the addition valve, and a determination process that determines that a misfire has occurred in the internal combustion engine when a detection value of the downstream concentration is decreased on condition that the addition process is being executed.

2. The misfire detection device for an internal combustion engine according to claim 1, wherein a NOx concentration in the exhaust gas flowing into the selective reduction type catalyst is an upstream concentration, the processing circuitry is configured to execute a removal rate calculation process that calculates a NOx removal rate in the selective reduction type catalyst based on the upstream concentration and the downstream concentration, and the determination process includes a process that determines that a misfire has occurred in the internal combustion engine when the NOx removal rate is greater than a predetermined value.

3. The misfire detection device for an internal combustion engine according to claim 2, wherein the determination process includes a variable setting process that sets the predetermined value to a smaller value in a case where a flow rate of the exhaust gas flowing into the selective reduction type catalyst is high than in a case where the flow rate of the exhaust gas is low.

4. The misfire detection device for an internal combustion engine according to claim 2, wherein an adsorption amount is an amount of the reducing agent adsorbed by the selective reduction type catalyst, and the determination process includes a variable setting process that sets the predetermined value to a larger value in a case where the adsorption amount is large than in a case where the adsorption amount is small.

5. The misfire detection device for an internal combustion engine according to claim 2, wherein the determination process includes a variable setting process that sets the predetermined value to a larger value in a case where a temperature of the selective reduction type catalyst is high than in a case where the temperature of the selective reduction type catalyst is low.

6. The misfire detection device for an internal combustion engine according to claim 2, wherein the determination process includes a process that determines that a misfire has occurred when a cumulative time of a state in which the NOx removal rate is greater than the predetermined value is equal to or greater than a predetermined time, and even when the NOx removal rate is greater than the predetermined value, a period of time during which the NOx removal rate is decreasing is disregarded in calculating the cumulative time.

7. The misfire detection device for an internal combustion engine according to claim 1, wherein the addition process includes an addition amount calculation process that calculates an addition amount of the reducing agent, the addition amount of the reducing agent being an operating amount for reducing an amount of NOx flowing out downstream of the selective reduction type catalyst through open loop control, and an operation process that operates the addition valve to add the reducing agent of the addition amount, which is calculated by the addition amount calculation process, to the exhaust gas.

8. The misfire detection device for an internal combustion engine according to claim 1, wherein the determination process includes a process that determines that a misfire has occurred in the internal combustion engine based on a rotational fluctuation amount of a crankshaft of the internal combustion engine.

9. A method for detecting a misfire of an internal combustion engine, the internal combustion engine including a selective reduction type catalyst arranged in an exhaust gas passage and configured to remove NOx from an exhaust gas, an addition valve arranged in the exhaust gas passage at an upstream side of the selective reduction type catalyst and configured to add a reducing agent into the exhaust gas, and a NOx concentration sensor arranged in the exhaust gas passage at a downstream side of the selective reduction type catalyst and configured to detect a downstream concentration, the downstream concentration being a NOx concentration in the exhaust gas at the downstream side of the selective reduction type catalyst, the method comprising:

executing an addition process that adds the reducing agent into the exhaust gas through operation of the addition valve; and executing a determination process that determines that a misfire has occurred in the internal combustion engine when a detection value of the downstream concentration is decreased on condition that the addition process is being executed.

* * * * *